United States Patent
Sato et al.

(10) Patent No.: US 11,443,705 B2
(45) Date of Patent: Sep. 13, 2022

(54) IMAGE DISPLAY DEVICE FOR DISPLAYING MOVING IMAGES

(71) Applicant: SONY GROUP CORPORATION, Tokyo (JP)

(72) Inventors: Yoshihisa Sato, Tokyo (JP); Takahiro Mochizuki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/291,311

(22) PCT Filed: Nov. 6, 2019

(86) PCT No.: PCT/JP2019/043562
§ 371 (c)(1),
(2) Date: May 5, 2021

(87) PCT Pub. No.: WO2020/100695
PCT Pub. Date: May 22, 2020

(65) Prior Publication Data
US 2022/0005424 A1    Jan. 6, 2022

(30) Foreign Application Priority Data
Nov. 13, 2018 (JP) .............................. JP2018-212667

(51) Int. Cl.
*G09G 3/34* (2006.01)
*G09G 3/36* (2006.01)
(Continued)

(52) U.S. Cl.
CPC .......... *G09G 3/36* (2013.01); *G02F 1/13306* (2013.01); *G02F 1/133607* (2021.01); *G09G 3/346* (2013.01); *G09G 2320/064* (2013.01)

(58) Field of Classification Search
CPC .... G09G 3/36; G09G 3/346; G09G 2320/064; G02F 1/133607; G02F 1/13306
See application file for complete search history.

(56) References Cited

U.S. PATENT DOCUMENTS

2008/0088914 A1    4/2008   Toyooka
2008/0291343 A1    11/2008   Maeda et al.
(Continued)

FOREIGN PATENT DOCUMENTS

CN    101095184 A    12/2007
CN    101292541 A    10/2008
(Continued)

OTHER PUBLICATIONS

International Search Report prepared by the Japan Patent Office dated Jan. 23, 2020, for International Application No. PCT/JP2019/043562.

*Primary Examiner* — Roy P Rabindranath
(74) *Attorney, Agent, or Firm* — Sheridan Ross P.C.

(57) ABSTRACT

Provided is a device that displays a moving image with high dynamic range. A control unit controls drive of at least one of a light source unit, a phase modulation unit, or an intensity modulation unit in accordance with an image signal. The light source unit applies first illumination light to a phase modulation panel of the phase modulation unit, which modulates a phase of the first illumination light applied from the light source unit, divides second illumination light for each predetermined phase modulation pixel group of the phase modulation panel, and applies the second illumination light to the intensity modulation panel for each predetermined intensity modulation pixel group of the intensity modulation panel, and the intensity modulation panel modulates an intensity of the second illumination light applied from the phase modulation panel.

20 Claims, 2 Drawing Sheets

(51) Int. Cl.
*G02F 1/1335* (2006.01)
*G02F 1/133* (2006.01)

(56) References Cited

U.S. PATENT DOCUMENTS

| | | | |
|---|---|---|---|
| 2009/0091713 A1* | 4/2009 | Shirai | G02B 26/0841 |
| | | | 353/31 |
| 2009/0303417 A1 | 12/2009 | Mizushima et al. | |
| 2010/0110308 A1 | 5/2010 | Nicholson et al. | |
| 2013/0100181 A1 | 4/2013 | Choe et al. | |

FOREIGN PATENT DOCUMENTS

| | | | | |
|---|---|---|---|---|
| CN | 101360948 A | | 2/2009 | |
| JP | 2008-015064 | | 1/2008 | |
| JP | 2008-089686 | | 4/2008 | |
| JP | 2008-292725 | | 12/2008 | |
| JP | 2010-140017 | | 6/2010 | |
| JP | 2014-182269 | | 9/2014 | |
| JP | 2014182269 | * | 9/2014 | G03B 21/00 |
| WO | WO 2007/058203 | | 5/2007 | |

\* cited by examiner

FIG. 1
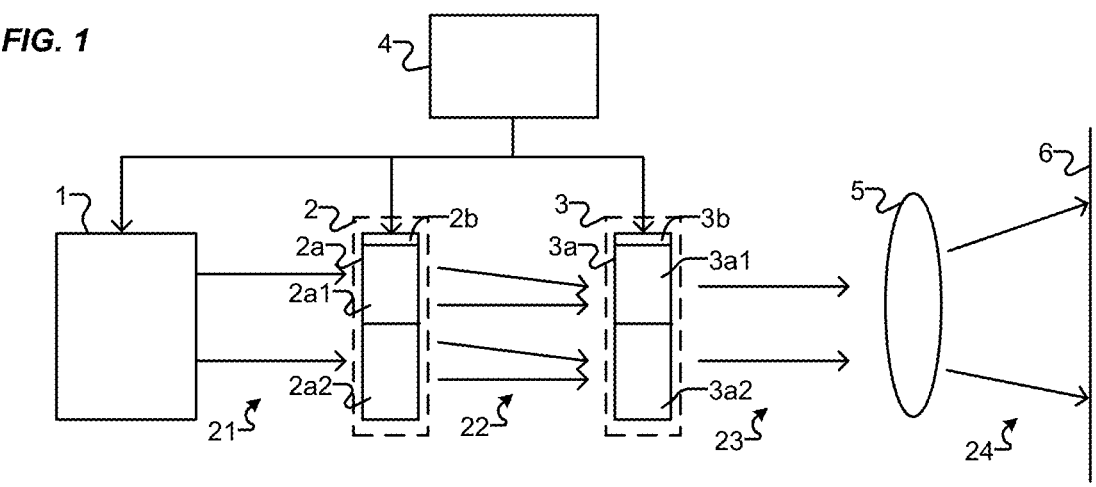
FIG. 2
FIG. 3
FIG. 4
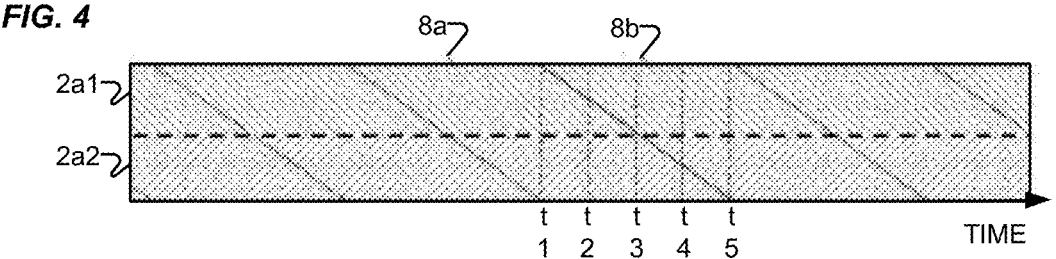
FIG. 5

IMAGE DISPLAY DEVICE FOR DISPLAYING MOVING IMAGES

CROSS REFERENCE TO RELATED APPLICATIONS

This application is a national stage application under 35 U.S.C. 371 and claims the benefit of PCT Application No. PCT/JP2019/043562 having an international filing date of 6 Nov. 2019, which designated the United States, which PCT application claimed the benefit of Japanese Patent Application No. 2018-212667 filed 13 Nov. 2018, the entire disclosures of each of which are incorporated herein by reference.

TECHNICAL FIELD

The present technology relates to an image display device.

BACKGROUND ART

In recent years, attention has been focused on image display technology that can express brightness and color as if it were in the real world. In a case where an image is displayed by an image display device capable of expressing a narrow range of brightness (dynamic range), significantly bright portions such as the sun are displayed in white due to so-called blown out highlights, and dark portions are displayed in black due to so-called blocked up shadows. As a result, the image displayed by the image display device is far from a real landscape. Since a real landscape has a wide dynamic range, a technology that allows an image to be displayed in a wider dynamic range (high dynamic range) is desired. Prior art for displaying an image in a high dynamic range is disclosed in Patent Document 1.

Patent Document 1 discloses a lighting device characterized by including a light source unit that supplies coherent light and a phase modulation unit that modulates a phase of the coherent light from the light source unit so that the coherent light is incident on a surface to be irradiated, in which the phase modulation unit changes the phase of the coherent light while generating diffracted light in accordance with a phase modulation pattern, so that light with an intensity regulated for each unit region set on the surface to be irradiated is incident on the surface to be irradiated. Patent Document 1 describes that the phase modulation unit allocates light to change the intensity of incident light for each unit region.

CITATION LIST

Patent Document

Patent Document 1: Japanese Patent Application Laid-Open No. 2008-15064

SUMMARY OF THE INVENTION

Problems to be Solved by the Invention

However, there has been a technical problem in allowing the image display device to display a moving image in a high dynamic range.

In order to allow a moving image to be displayed as a smoothly moving image, a plurality of still images (frames) is continuously displayed while being instantly switched just like an animation, for example.

The phase modulation unit included in the image display device has a function of allocating light in accordance with an image signal and improving a peak brightness of the light by reproducing a hologram by diffraction of light. The phase modulation unit performs Fourier transform of an image signal on the entire surface of the phase modulation unit. Thus, even when a part of the region of the phase modulation unit is being rewritten in accordance with an image signal, light is applied from the entire surface of the phase modulation unit to the entire surface of an intensity modulation unit. In hologram reproduction by diffraction of light, the entire surface of the intensity modulation unit is reproduced even when a part of the region is being rewritten.

The phase modulation unit is rewritten in order from the upper edge to the lower edge, for example. Thus, when frames are being switched, light to be allocated by the phase modulation unit is split into light corresponding to a frame before the switching and light corresponding to a frame after the switching. After the light has been split, the light corresponding to one of the frames is determined to be unnecessary and is discarded without being used. As a result, there has been a problem in that the peak brightness of light is reduced.

It is therefore a primary object of the present technology to provide an image display device that displays a moving image in a high dynamic range by preventing a reduction in peak brightness of light caused by distribution of light emitted by a phase modulation unit.

Solutions to Problems

The present technology provides an image display device including at least a control unit, a light source unit, a phase modulation unit, and an intensity modulation unit, in which the control unit controls drive of at least one of the light source unit, the phase modulation unit, or the intensity modulation unit in accordance with an image signal, the phase modulation unit includes a phase modulation panel constituted by a plurality of phase modulation pixel groups, the intensity modulation unit includes an intensity modulation panel constituted by a plurality of intensity modulation pixel groups, the light source unit applies first illumination light to the phase modulation panel, the phase modulation panel modulates a phase of the first illumination light applied from the light source unit, divides second illumination light for each predetermined phase modulation pixel group, and applies the second illumination light to the intensity modulation panel for each predetermined intensity modulation pixel group, and the intensity modulation panel modulates an intensity of the second illumination light applied from the phase modulation panel.

The phase modulation panel and the intensity modulation panel may be rewritten line-sequentially or in a similar order.

The light source unit can emit coherent light.

The light source unit can emit a laser beam.

The phase modulation panel and/or the intensity modulation panel may be a liquid crystal element.

The phase modulation panel and/or the intensity modulation panel may be a MEMS mirror.

The phase modulation panel may apply the second illumination light in such a way that side edges of adjacent pieces of the second illumination light overlap each other.

The light source unit can emit invisible light.

Furthermore, the present technology provides the image display device that further includes a plurality of the light source units, a plurality of the phase modulation panels, a plurality of the intensity modulation panels, and a multiplexer, in which each of the light source units emits the first illumination light in red, green, or blue, each of the phase modulation panels emits the second illumination light in red, green, or blue, each of the intensity modulation panels emits third illumination light in red, green, or blue, and the multiplexer combines and emits the third illumination light emitted from each of the intensity modulation panels.

The multiplexer can combine pieces of the illumination light by allowing light of a predetermined wavelength to pass through and reflecting light of other wavelengths.

The multiplexer may be a dichroic prism.

Furthermore, the present technology provides the image display device that further includes a color separator, a plurality of the phase modulation panels, a plurality of the intensity modulation panels, and a multiplexer, in which the color separator color-separates white illumination light emitted from the light source unit into pieces of the illumination light in red, green, or blue, and applies the illumination light to each of the phase modulation panels, each of the phase modulation panels emits the second illumination light in at least red, green, and blue, each of the intensity modulation panels emits third illumination light in at least red, green, and blue, and the multiplexer combines and emits the third illumination light emitted from each of the intensity modulation panels.

The color separator can separate color elements of the white illumination light by allowing light of a predetermined wavelength to pass through and reflecting light of other wavelengths.

The color separator may be a dichroic prism.

BRIEF DESCRIPTION OF DRAWINGS

FIG. 1 is an overall configuration diagram of an image display device according to the present technology.

FIG. 2 illustrates a video signal of an Nth frame of a certain moving image.

FIG. 3 illustrates a video signal of an N+1th frame of the certain moving image.

FIG. 4 illustrates how a phase modulation pattern of a phase modulation panel according to the present technology changes over time.

FIG. 5 illustrates how the phase modulation pattern of the phase modulation panel, an illumination light pattern applied to an intensity modulation panel, and a display image pattern of the intensity modulation panel according to the present technology change over time.

MODE FOR CARRYING OUT THE INVENTION

Figure 6:
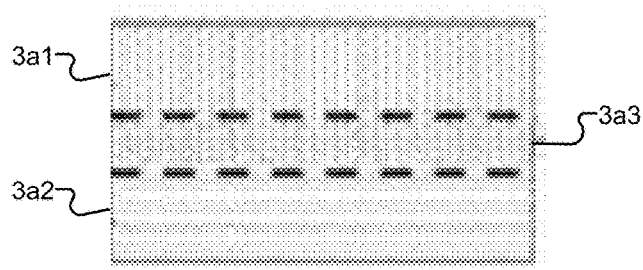
FIG. 6 illustrates an intensity modulation panel according to the present technology.

Preferred modes for carrying out the present technology will be described below with reference to the attached drawings. Note that the embodiments described below are typical embodiments of the present technology, and the scope of the present technology is not limited to these embodiments. Note that the present technology will be described in the following order.

1. First embodiment according to the present technology (monochromatic light)
2. Second embodiment according to the present technology (overlapping of pieces of illumination light)
3. Third embodiment according to the present technology (invisible light)
4. Fourth embodiment according to the present technology (full color (1))
5. Fifth embodiment according to the present technology (full color (2))
6. Sixth embodiment according to the present technology (block unit)

1. First embodiment according to the present technology (monochromatic light)

FIG. 1 illustrates an overall configuration diagram of an image display device according to the present technology. The image display device according to the present technology includes at least a light source unit 1, a phase modulation unit 2, an intensity modulation unit 3, and a control unit 4. The phase modulation unit 2 is arranged between the light source unit 1 and the intensity modulation unit 3.

The phase modulation unit 2 includes a phase modulation panel 2a and a phase modulation panel drive unit 2b. The phase modulation panel 2a is constituted by a plurality of phase modulation pixel groups. In the present embodiment, the phase modulation panel 2a is constituted by a phase modulation pixel group 2a1 in the upper half and a phase modulation pixel group 2a2 in the lower half.

The intensity modulation unit 3 includes an intensity modulation panel 3a and an intensity modulation panel drive unit 3b. The intensity modulation panel 3a is constituted by a plurality of intensity modulation pixel groups. In the present embodiment, the intensity modulation panel 3a is constituted by an intensity modulation pixel group 3a1 in the upper half and an intensity modulation pixel group 3a2 in the lower half.

The light source unit 1 applies first illumination light 21 to the phase modulation panel 2a. The phase modulation panel 2a modulates a phase of the applied first illumination light 21, and applies second illumination light 22 to the intensity modulation panel 3a. The intensity modulation panel 3a modulates an intensity of the applied second illumination light 22, and applies third illumination light 23 to a lens 5. The lens 5 projects fourth illumination light 24 onto a screen 6.

<Control Unit>

The control unit 4 controls drive of at least one of the light source unit 1, the phase modulation unit 2, or the intensity modulation unit 3 in accordance with an image signal of an image to be projected onto the screen 6.

The control unit 4 extracts a low-frequency component in a spatial frequency from the image signal, and generates a phase modulation panel reproduction signal. Next, the control unit 4 generates an intensity modulation panel reproduction signal by dividing the image signal by the phase modulation panel reproduction signal.

The control unit 4 inputs the phase modulation panel reproduction signal to the phase modulation panel drive unit 2b. In a similar manner, the control unit 4 inputs the intensity modulation panel reproduction signal to the intensity modulation panel drive unit 3b.

<Light Source Unit>

The light source unit 1 emits the first illumination light 21, which is monochromatic light. A known light source unit can be used as the light source unit 1.

It is desirable that the light source unit 1 emit coherent light as the first illumination light 21. Coherent light allows the phase modulation panel 2a to obtain good diffraction characteristics.

Moreover, the light source unit 1 is a point light source, and it is desirable that the light source unit 1 emit, for example, a laser beam as the first illumination light 21. In a case where the light source unit 1 is a point light source, the image display device can improve a light use efficiency, and can reduce the size of an optical system.

<Phase Modulation Unit>

The phase modulation panel drive unit 2b generates a drive signal for the phase modulation panel 2a in accordance with the phase modulation panel reproduction signal input from the control unit 4, and line-sequentially applies a phase modulation pattern to the pixel groups of the phase modulation panel 2a. In other words, the phase modulation panel 2a is rewritten line-sequentially.

Here, examples of a method for rewriting a panel include a surface scanning method and a line sequential scanning (progressive) method.

A panel is constituted by a group of a plurality of pixels. In the surface scanning method, all pixels are rewritten in a batch. When the panel is rewritten, information for all pixels needs to be stored in a batch, and the surface scanning method has a disadvantage that a memory having a larger capacity is used to store the information. Furthermore, the surface scanning method has a disadvantage that an electric circuit in the panel has a more complicated configuration as the number of pixels increases.

On the other hand, in the line sequential scanning method, pixels are sequentially rewritten in the horizontal or vertical direction of the panel. In a case where the pixels are rewritten in the horizontal direction, the pixels are sequentially rewritten from the left edge to the right edge of the panel, or from the right edge to the left edge. In a case where the pixels are rewritten in the vertical direction, the pixels are sequentially rewritten from the upper edge to the lower edge of the panel, or from the lower edge to the upper edge.

Compared with the surface scanning method, the line sequential scanning method has an advantage that a memory having a smaller capacity can be used and the electric circuit in the panel may have a simpler configuration. Thus, the line sequential scanning method is preferable to the surface scanning method. In the embodiments according to the present technology, the line sequential scanning method is used.

For the phase modulation panel 2a, for example, a liquid crystal element can be used. By using the liquid crystal element, the phase modulation panel 2a can easily change the phase modulation pattern. Alternatively, the phase modulation panel 2a may use a MEMS mirror. A MEMS mirror can change a mirror pattern at a higher speed than a liquid crystal element.

In accordance with the phase modulation pattern, the phase modulation panel 2a allocates the first irradiation light 21 to generate diffracted light (second illumination light 22). As a result, the phase modulation panel 2a collects a larger amount of illumination light in a region with high brightness. As a result, the peak brightness is improved.

Then, the phase modulation panel 2a divides the second illumination light 22 for each predetermined phase modulation pixel group, and applies the divided second illumination light 22 to the intensity modulation panel for each predetermined intensity modulation pixel group. In the embodiment illustrated in FIG. 1, the second illumination light 22 is applied from the phase modulation pixel group 2a1 in the upper half of the phase modulation panel 2a to the intensity modulation pixel group 3a1 in the upper half of the intensity modulation panel 3a. In a similar manner, the second illumination light 22 is applied from the phase modulation pixel group 2a2 in the lower half of the phase modulation panel 2a to the intensity modulation pixel group 3a2 in the lower half of the intensity modulation panel 3a.

By dividing the second illumination light 22 for each predetermined pixel group in this way, the image display device can prevent a reduction in peak brightness of the second illumination light 22. Note that the effects of the present technology will be described separately by using specific images.

Note that, in the one embodiment in FIG. 1, each of the phase modulation panel 2a and the intensity modulation panel 3a is divided into two pixel groups. Alternatively, they may be divided into three or more pixel groups.

Moreover, when a panel is divided into a plurality of pixel groups, the number of pixels (area) of each pixel group may not be equal, or may vary dynamically in accordance with an image. For example, the panel may be divided into a region where brightness and darkness are drastically switched for each frame and a region where the brightness and darkness are not drastically switched.

<Intensity Modulation Unit>

The intensity modulation panel drive unit 3b performs gamma correction or the like in accordance with the intensity modulation panel reproduction signal input from the control unit 4 to generate a drive signal for the intensity modulation panel 3a, and line-sequentially applies a display image pattern to the pixel groups of the intensity modulation panel 3a. In other words, the intensity modulation panel 3a is rewritten line-sequentially.

For the intensity modulation panel 3a, for example, a liquid crystal element can be used. By using the liquid crystal element, the intensity modulation panel 3a can easily change the display image pattern. Alternatively, the intensity modulation panel 3a may use a MEMS mirror. A MEMS mirror can change a mirror pattern at a higher speed than a liquid crystal element. Examples of using a MEMS mirror for the intensity modulation panel 3a include a digital micromirror device (DMD).

The intensity modulation panel 3a adjusts the amount of transmitted light of the second illumination light 22 applied from the phase modulation panel 2a in accordance with the display image pattern. As a result, bright regions are displayed brightly, and dark regions are displayed dark in an image. The image display device can display an image in a high dynamic range by combining phase modulation and intensity modulation.

Then, the intensity modulation panel 3a applies the third illumination light 23 to the lens 5.

<Lens>

The image display device may further include the lens 5. The lens 5 projects the fourth illumination light 24 onto the screen 6. A known lens can be used as the lens 5.

Next, the effects of the present technology will be described by using specific images. In a case where the image display device has the configuration described above, how the phase modulation pattern of the phase modulation panel 2a, an illumination light pattern applied to the intensity modulation panel 3a, and the display image pattern of the intensity modulation panel 3a change over time will be described with reference to FIGS. 2, 3, 4, and 5.

A case is assumed in which, in a certain moving image, for example, a video signal of an Nth frame is an image illustrated in FIG. 2. As illustrated in FIG. 2, in the Nth frame, there is a bright region on the left side, and other regions are dark. Then, for example, it is assumed that a video signal of the next N+1th frame is an image illustrated in FIG. 3. As illustrated in FIG. 3, in the N+1th frame, there is a bright region on the right side, and other regions are dark.

FIG. 4 illustrates how a phase modulation pattern of a phase modulation panel changes over time. In FIG. 4, a horizontal axis indicates passage of time. The closer to the right, the more time has passed. A vertical axis indicates the phase modulation pattern of the phase modulation panel. In this example, the phase modulation panel is divided into two phase modulation pixel groups (2a1 and 2a2), and is rewritten line-sequentially from the upper edge to the lower edge of the phase modulation panel. First, the phase modulation pixel group 2a1 in the upper half of the phase modulation panel is rewritten. Thereafter, the phase modulation pixel group 2a2 in the lower half of the phase modulation panel is rewritten.

Regions defined by diagonal lines from the upper left to the lower right indicate frames. The Nth frame illustrated in FIG. 2 corresponds to 8a in FIG. 4. The N+1th frame illustrated in FIG. 3 corresponds to 8b in FIG. 4. As illustrated in FIG. 4, the phase modulation panel is rewritten line-sequentially in accordance with the Nth frame 8a, and then the phase modulation panel is rewritten line-sequentially in accordance with the N+1th frame 8b.

FIG. 5 illustrates the phase modulation pattern of the phase modulation panel, the illumination light pattern applied to the intensity modulation panel, and the display image pattern of the intensity modulation panel at times t1, t2, t3, t4, and t5. Regarding the illumination light pattern applied to the intensity modulation panel, the illumination light pattern (7a to 7e) in a case where the second illumination light 22 applied to the intensity modulation panel is not divided and the illumination light pattern (9a to 9e) in a case where the second illumination light 22 is divided as in the present technology are illustrated.

At time t1, the phase modulation pattern of the phase modulation panel fully corresponds to the Nth frame 8a, as illustrated in FIGS. 4 and 5 (leftmost column).

The pattern of the second illumination light 22 applied from the phase modulation panel to the intensity modulation panel at this time is illustrated in FIG. 5. In the case where the second illumination light 22 is not divided, the illumination light pattern is in the state of 7a. In the case where the second illumination light 22 is divided, the illumination light pattern is in the state of 9a. Both illumination light patterns correspond to the Nth frame 8a (FIG. 2) .

At this time, the image display device displays an image of a display image pattern 10a of the intensity modulation panel. As in the phase modulation pattern of the phase modulation panel, the display image pattern 10a of the intensity modulation panel fully corresponds to the Nth frame 8a (FIG. 2). The illumination light pattern applied to the intensity modulation panel and the display image pattern of the intensity modulation panel coincide with each other.

Next, at time t2, in the phase modulation pattern of the phase modulation panel, the top quarter corresponds to the N+1th frame 8b, and the rest corresponds to the Nth frame 8a, as illustrated in FIGS. 4 and 5 (leftmost column).

The pattern of the second illumination light 22 applied from the phase modulation panel to the intensity modulation panel at this time is illustrated in FIG. 5. In the case where the second illumination light 22 is not divided, the illumination light pattern is in the state of 7b. On the other hand, in the case where the second illumination light 22 is divided, the illumination light pattern is in the state of 9b.

The illumination light pattern 7b in the case where the second illumination light 22 is not divided will be described. Since the top quarter of the phase modulation panel corresponds to the N+1th frame 8b (FIG. 3), a quarter of the second illumination light 22 is distributed to the N+1th frame 8b (FIG. 3). Then, since the remaining region of the phase modulation panel corresponds to the Nth frame 8a (FIG. 2), three-quarters of the second illumination light 22 is distributed to the Nth frame 8a (FIG. 2).

Here, in a case where the image display device displays the Nth frame 8a (FIG. 2) and the N+1th frame 8b (FIG. 3), the peak brightness with which these frames are supposed to be displayed is assumed to be 100%. At this time, due to distribution of the second illumination light 22, the peak brightness of the second illumination light 22 corresponding to the N+1th frame 8b (FIG. 3) is 25%, and the peak brightness of the second illumination light 22 corresponding to the Nth frame 8a (FIG. 2) is 75%.

At this time, the image display device displays an image of a display image pattern 10b of the intensity modulation panel. In the display image pattern 10b of the intensity modulation panel, as in the phase modulation pattern of the phase modulation panel, the top quarter corresponds to the N+1th frame 8b (FIG. 3), and the rest corresponds to the Nth frame 8a (FIG. 2). Since both frames have dark regions in the top quarter, the display image pattern 10b of the intensity modulation panel corresponds to the Nth frame 8a (FIG. 2).

In order to prevent a reduction in peak brightness, it is desirable that the illumination light pattern applied to the intensity modulation panel and the display image pattern of the intensity modulation panel coincide with each other for a long time. However, as described above, in the illumination light pattern 7b in the case where the second illumination light 22 is not divided, a quarter of the second illumination light 22 is distributed to the N+1th frame 8b (FIG. 3). Thus, the illumination light does not coincide with the display image pattern 10b of the intensity modulation panel, and is discarded. Thus, the peak brightness of the second illumination light 22 is reduced to 75% (three-quarters).

Next, the illumination light pattern 9b in the case where the second illumination light 22 is divided as in the present technology will be described. When the top quarter of the phase modulation panel has been rewritten, in the phase modulation pixel group 2a1 in the upper half of the phase modulation panel, the upper half of that pixel group has been rewritten. That is, in the second illumination light 22 applied from the phase modulation pixel group 2a1 in the upper half of the phase modulation panel, half of the illumination light is distributed to the N+1th frame 8b (FIG. 3), and the other half is distributed to the Nth frame 8a (FIG. 2).

On the other hand, the second illumination light 22 applied from the phase modulation pixel group 2a2 in the lower half of the phase modulation panel fully corresponds to the Nth frame 8a (FIG. 2). The second illumination light 22 has not been distributed, and the peak brightness has not been reduced.

The second illumination light 22 is applied from the phase modulation pixel group 2a2 in the lower half of the phase modulation panel to the intensity modulation pixel group 3a2 in the lower half of the intensity modulation panel. The lower half of the illumination light pattern 9b and the lower half of the display image pattern 10b coincide with each other. Thus, the peak brightness of the bright region in the display image pattern 10b of the intensity modulation panel remains 100%.

Next, at time t3, in the phase modulation pattern of the phase modulation panel, the upper half corresponds to the N+1th frame 8b, and the lower half corresponds to the Nth frame 8a, as illustrated in FIGS. 4 and 5 (leftmost column).

The pattern of the second illumination light 22 applied from the phase modulation panel to the intensity modulation panel at this time is illustrated in FIG. 5. In the case where the second illumination light 22 is not divided, the illumination light pattern is in the state of 7c. On the other hand, in the case where the second illumination light 22 is divided, the illumination light pattern is in the state of 9c.

The illumination light pattern 7c in the case where the second illumination light 22 is not divided will be described. Since the upper half of the phase modulation panel corresponds to the N+1th frame 8b (FIG. 3), half of the second illumination light 22 is distributed to the N+1th frame 8b (FIG. 3). Then, since the lower half of the phase modulation panel corresponds to the Nth frame 8a (FIG. 2), the other half of the second illumination light 22 is distributed to the Nth frame 8a (FIG. 2). The peak brightness of the second illumination light 22 corresponding to the N+1th frame 8b (FIG. 3) is 50%, and the peak brightness of the second illumination light 22 corresponding to the Nth frame 8a (FIG. 2) is 50%.

At this time, the image displayed by the image display device is a display image pattern 10c of the intensity modulation panel. In the display image pattern 10c of the intensity modulation panel, as in the phase modulation pattern of the phase modulation panel, the upper half corresponds to the N+1th frame 8b (FIG. 3), and the lower half corresponds to the Nth frame 8a (FIG. 2). From the phase modulation panel to the intensity modulation panel, the second illumination light 22 with a peak brightness of 50% corresponding to the N+1th frame 8b (FIG. 3) is applied, and the second illumination light 22 with a peak brightness of 50% corresponding to the Nth frame 8a (FIG. 2) is applied. In each frame, the peak brightness has been reduced to 50%.

Next, the illumination light pattern 9c in the case where the second illumination light 22 is divided as in the present technology will be described. The second illumination light 22 applied from the phase modulation pixel group 2a1 in the upper half of the phase modulation panel fully corresponds to the N +1th frame 8b (FIG. 3). The second illumination light 22 applied from the phase modulation pixel group 2a2 in the lower half of the phase modulation panel fully corresponds to the Nth frame 8a (FIG. 2). The second illumination light 22 has not been distributed, and the peak brightness has not been reduced.

The second illumination light 22 is applied from the phase modulation pixel group 2a1 in the upper half of the phase modulation panel to the intensity modulation pixel group 3a1 in the upper half of the intensity modulation panel. Furthermore, the second illumination light 22 is applied from the phase modulation pixel group 2a2 in the lower half of the phase modulation panel to the intensity modulation pixel group 3a2 in the lower half of the intensity modulation panel. The illumination light pattern 9c and the display image pattern 10c coincide with each other. Thus, the peak brightness of the bright region in the display image pattern 10c of the intensity modulation panel remains 100%.

Next, at time t4, in the phase modulation pattern of the phase modulation panel, the top three-quarters corresponds to the N+1th frame 8b, and the rest corresponds to the Nth frame 8a, as illustrated in FIGS. 4 and 5 (leftmost column).

The pattern of the second illumination light 22 applied from the phase modulation panel to the intensity modulation panel at this time is illustrated in FIG. 5. In the case where the second illumination light 22 is not divided, the illumination light pattern is in the state of 7d. On the other hand, in the case where the second illumination light 22 is divided, the illumination light pattern is in the state of 9d.

The illumination light pattern 7d in the case where the second illumination light 22 is not divided will be described. Since the top three-quarters of the phase modulation panel corresponds to the N+1th frame 8b (FIG. 3), three-quarters of the second illumination light 22 is distributed to the N+1th frame 8b (FIG. 3). Then, since the remaining region of the phase modulation panel corresponds to the Nth frame 8a (FIG. 2), a quarter of the second illumination light 22 is distributed to the Nth frame 8a (FIG. 2). The peak brightness of the second illumination light 22 corresponding to the N+1th frame 8b (FIG. 3) is 75%, and the peak brightness of the second illumination light 22 corresponding to the Nth frame 8a (FIG. 2) is 25%.

At this time, the image displayed by the image display device is a display image pattern 10d of the intensity modulation panel. In the display image pattern 10d of the intensity modulation panel, as in the phase modulation pattern of the phase modulation panel, the top three-quarters corresponds to the N+1th frame 8b (FIG. 3), and the rest corresponds to the Nth frame 8a (FIG. 2). Since both frames have dark regions in the bottom quarter, the display image pattern 10d of the intensity modulation panel corresponds to the N+1th frame 8b (FIG. 3).

As described above, in order to prevent a reduction in peak brightness, it is desirable that the illumination light pattern applied to the intensity modulation panel and the display image pattern of the intensity modulation panel coincide with each other for a long time. However, in the illumination light pattern 7d in the case where the second illumination light 22 is not divided, a quarter of the second illumination light 22 is distributed to the Nth frame 8a (FIG. 2). Thus, the illumination light does not coincide with the display image pattern 10d of the intensity modulation panel, and is discarded. Thus, the peak brightness of the second illumination light 22 is reduced to 75% (three-quarters).

Next, the illumination light pattern 9d in the case where the second illumination light 22 is divided as in the present technology will be described. When the top three-quarters of the phase modulation panel has been rewritten, in the phase modulation pixel group 2a2 in the lower half of the phase modulation panel, the upper half of that pixel group has been rewritten. That is, in the second illumination light 22 applied from the phase modulation pixel group 2a2 in the lower half of the phase modulation panel, half of the illumination light is distributed to the N+1th frame 8b (FIG. 3), and the other half is distributed to the Nth frame 8a (FIG. 2).

On the other hand, the second illumination light 22 applied from the phase modulation pixel group 2a1 in the upper half of the phase modulation panel fully corresponds to the N+1th frame 8b (FIG. 3). The second illumination light 22 has not been distributed, and the peak brightness has not been reduced.

The second illumination light 22 is applied from the phase modulation pixel group 2a1 in the upper half of the phase modulation panel to the intensity modulation pixel group 3a1 in the upper half of the intensity modulation panel. The upper half of the illumination light pattern 9d and the upper half of the display image pattern 10d coincide with each other. Thus, the peak brightness of the bright region in the display image pattern 10d of the intensity modulation panel remains 100%.

Finally, at time t5, in the phase modulation pattern of the phase modulation panel, all phase modulation pixel groups correspond to the N+1th frame 8*b*, as illustrated in FIGS. 4 and 5 (leftmost column).

The pattern of the second illumination light 22 applied from the phase modulation panel to the intensity modulation panel at this time is illustrated in FIG. 5. In the case where the second illumination light 22 is not divided, the illumination light pattern is in the state of 7*e*. In the case where the second illumination light 22 is divided, the illumination light pattern is in the state of 9*e*. Both illumination light patterns correspond to the N+1th frame 8*b* (FIG. 3).

At this time, the image displayed by the image display device is a display image pattern 10*e* of the intensity modulation panel. As in the phase modulation pattern of the phase modulation panel, the display image pattern 10*e* of the intensity modulation panel fully corresponds to the N+1th frame 8*b* (FIG. 3). The illumination light pattern applied to the intensity modulation panel and the display image pattern of the intensity modulation panel coincide with each other.

As described above, in order to prevent a reduction in peak brightness, it is desirable that the illumination light pattern applied to the intensity modulation panel and the display image pattern of the intensity modulation panel coincide with each other for a long time. However, in the case where the second illumination light 22 emitted by the phase modulation panel is not divided, the time for which the illumination light pattern applied to the intensity modulation panel and the display image pattern of the intensity modulation panel coincide with each other becomes extremely short. In the example in FIG. 5, the illumination light pattern (7*a* to 7*e*) applied to the intensity modulation panel and the display image pattern (10*a* to 10*e*) of the intensity modulation panel coincide with each other only at the moment of time t1 (7*a* and 10*a*) and the moment of time t5 (7*e* and 10*e*).

On the other hand, in the present technology, as illustrated in FIG. 5, the lower half of the illumination light pattern (9*a* to 9*c*) applied to the intensity modulation panel and the lower half of the display image pattern (10*a* to 10*c*) of the intensity modulation panel coincide with each other from time t1 to time t3. Then, from time t3 to time t5, the upper half of the illumination light pattern (9*c* to 9*e*) applied to the intensity modulation panel and the upper half of the display image pattern (10*c* to 10*e*) of the intensity modulation panel coincide with each other.

The longer the time for which the illumination light pattern applied to the intensity modulation panel and the display image pattern of the intensity modulation panel coincide with each other, the greater the amount of transmitted light adjusted by the intensity modulation panel. As a result, the dynamic range becomes wider, so that the image display device can display an image or the like in a high dynamic range. In the case where the second illumination light 22 emitted by the phase modulation panel is not divided, the time for which the displayed peak brightness remains 100% is extremely limited. On the other hand, in the present technology, the second illumination light 22 is divided, so that the peak brightness always remains 100%. This makes it possible to prevent a reduction in dynamic range.

2. Second embodiment according to the present technology (overlapping of pieces of illumination light)

In the image display device according to the present technology, a phase modulation panel may apply illumination light so that side edges of adjacent pieces of the illumination light overlap each other. FIG. 6 illustrates a drawing of an intensity modulation panel in which illumination light is applied so that side edges of adjacent pieces of the illumination light overlap each other.

FIG. 6 illustrates the intensity modulation panel according to the present technology. As illustrated in FIG. 6, a side edge of illumination light applied to an intensity modulation pixel group 3*a*1 in the upper half of the intensity modulation panel and a side edge of illumination light applied to an intensity modulation pixel group 3*a*2 in the lower half overlap each other in a region 3*a*3.

In a case where illumination light applied to the intensity modulation pixel group 3*a*1 in the upper half and illumination light applied to the intensity modulation pixel group 3*a*2 in the lower half do not overlap each other, there is a possibility that a region to which illumination light is not applied may occur between the illumination light applied to the intensity modulation pixel group 3*a*1 in the upper half and the illumination light applied to the intensity modulation pixel group 3*a*2 in the lower half. Furthermore, there is also a possibility that positions to which pieces of illumination light are applied may be slightly misaligned. As a result, a boundary between the upper half illumination light and the lower half illumination light becomes noticeable.

On the other hand, allowing the phase modulation panel to apply illumination light so that side edges of adjacent pieces of the illumination light overlap each other has a useful effect of making the boundary between the pieces of the illumination light less noticeable.

Moreover, it is possible to smoothly attenuate the brightness of the illumination light applied to the region 3*a*3 where the pieces of the illumination light overlap each other, thereby making the boundary between the pieces of the illumination light less noticeable.

3. Third embodiment according to the present technology (invisible light)

The light source unit included in the image display device according to the present technology may emit not only visible light but also invisible light. Invisible light includes infrared light and ultraviolet light.

In a case where illumination light emitted by the light source unit is infrared light, the image display device according to the present technology is applicable to, for example, a night-vision device. In a case where illumination light emitted by the light source unit is ultraviolet light, the image display device according to the present technology is applicable to, for example, a projector that projects ultraviolet light to a screen that reacts to ultraviolet light and fluoresces.

4. Fourth embodiment according to the present technology (full color (1))

Figure 7:
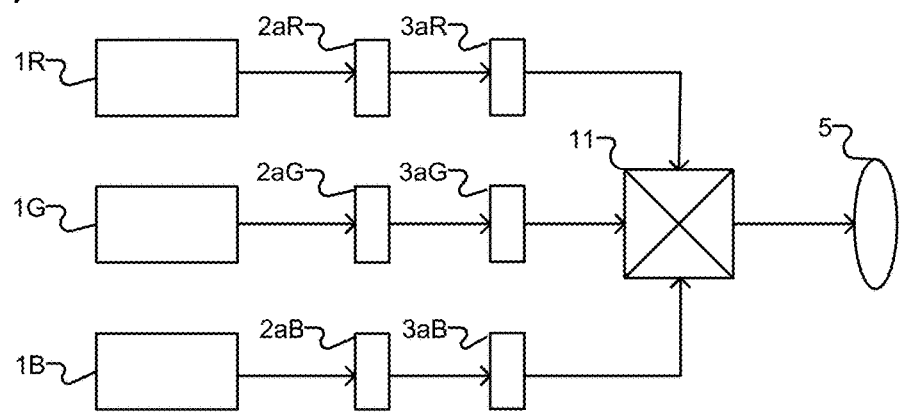
FIG. 7 is an overall configuration diagram of an image display device according to the present technology.

The image display device according to the present technology may further include a plurality of light source units, a plurality of phase modulation panels, a plurality of intensity modulation panels, and a multiplexer. FIG. 7 illustrates an overall configuration diagram of one embodiment according to the present technology.

The image display device includes the plurality of light source units. Each light source unit emits, for example, red, green, or blue illumination light. In the one embodiment illustrated in FIG. 7, the image display device includes a red light source unit 1R that emits red illumination light, a green light source unit 1G that emits green illumination light, and a blue light source unit 1B that emits blue illumination light.

Note that it is not always necessary that the image display device include light source units of three colors in this way, and may include light source units of four or more colors. The same applies to the following components.

The image display device includes the plurality of phase modulation panels. Each phase modulation panel emits, for example, red, green, or blue illumination light. In the one embodiment illustrated in FIG. 7, the image display device includes a red phase modulation panel 2aR, a green phase modulation panel 2aG, and a blue phase modulation panel 2aB.

The image display device includes the plurality of intensity modulation panels. Each intensity modulation panel emits, for example, red, green, or blue illumination light. In the one embodiment illustrated in FIG. 7, the image display device includes a red intensity modulation panel 3aR, a green intensity modulation panel 3aG, and a blue intensity modulation panel 3aB.

The red phase modulation panel 2aR modulates a phase of red illumination light applied from the red light source unit 1R, and applies the red illumination light to the red intensity modulation panel 3aR. The green phase modulation panel 2aG modulates a phase of green illumination light applied from the green light source unit 1G, and applies the green illumination light to the green intensity modulation panel 3aG. The blue phase modulation panel 2aB modulates a phase of blue illumination light applied from the blue light source unit 1B, and applies the blue illumination light to the blue intensity modulation panel 3aB.

The image display device includes a multiplexer 11 that combines and emits illumination light applied from each intensity modulation panel. In the one embodiment illustrated in FIG. 7, the multiplexer 11 combines red illumination light applied from the red intensity modulation panel 3aR, green illumination light applied from the green intensity modulation panel 3aG, and blue illumination light applied from the blue intensity modulation panel 3aB. The multiplexer 11 applies the combined illumination light to a lens 5.

The multiplexer 11 combines pieces of illumination light by allowing light of a predetermined wavelength to pass through and reflecting light of other wavelengths. As an example, a dichroic prism or the like can be used for the multiplexer 11.

In this way, the multiplexer 11 combines a plurality of pieces of monochromatic light so that the image display device can display full-color images and moving images.

Since other components are similar to those in the first embodiment, detailed description thereof will be omitted. It goes without saying that each phase modulation panel and each intensity modulation panel are constituted by a plurality of pixel groups, and illumination light is divided for each pixel group.

5. Fifth embodiment according to the present technology (full color (2))

Figure 8:
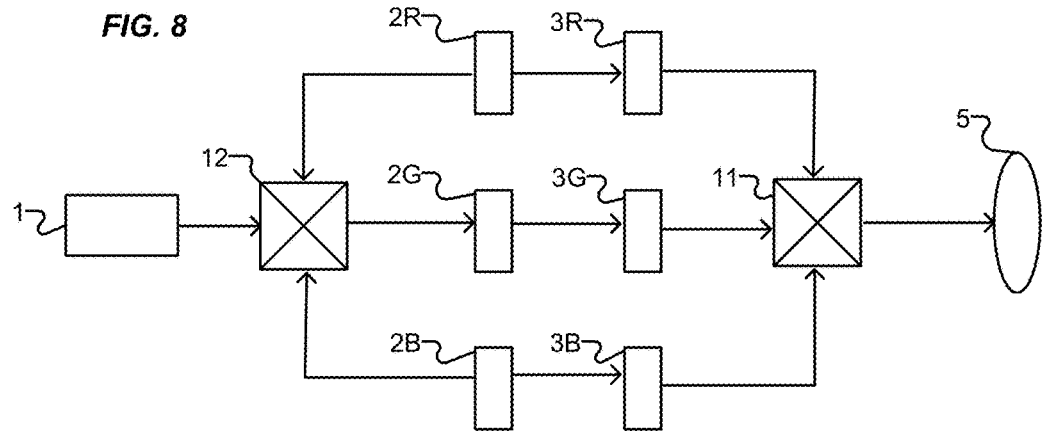
FIG. 8 is an overall configuration diagram of an image display device according to the present technology.

The image display device according to the present technology may further include a color separator, a plurality of phase modulation panels, a plurality of intensity modulation panels, and a multiplexer. FIG. 8 illustrates an overall configuration diagram of one embodiment according to the present technology.

The image display device includes a color separator 12. The color separator 12 color-separates white illumination light emitted by a light source unit into, for example, red illumination light, green illumination light, and blue illumination light. In the one embodiment illustrated in FIG. 8, the color separator 12 color-separates white illumination light emitted by a light source unit 1 into, for example, red illumination light, green illumination light, and blue illumination light.

Note that it is not always necessary that the color separator color-separate white illumination light into three colors in this way, and may color-separate white illumination light into four or more colors. The same applies to the following components.

The color separator 12 separates color elements of illumination light by allowing light of a predetermined wavelength to pass through and reflecting light of other wavelengths. As an example, a dichroic prism or the like can be used for the color separator 12.

The image display device includes the plurality of phase modulation panels. Each of the phase modulation panels emits illumination light in at least red, green, and blue. In the one embodiment illustrated in FIG. 8, the image display device includes a red phase modulation panel 2aR, a green phase modulation panel 2aG, and a blue phase modulation panel 2aB.

The image display device includes the plurality of intensity modulation panels. Each of the intensity modulation panels emits illumination light in at least red, green, and blue. In the one embodiment illustrated in FIG. 8, the image display device includes a red intensity modulation panel 3aR, a green phase modulation panel 3aG, and a blue phase modulation panel 3aB.

The red phase modulation panel 2aR modulates a phase of red illumination light applied from the color separator 12, and applies the red illumination light to the red intensity modulation panel 3aR. The green phase modulation panel 2aG modulates a phase of green illumination light applied from the color separator 12, and applies the green illumination light to a green intensity modulation panel 3aG. The blue phase modulation panel 2aB modulates a phase of blue illumination light applied from the color separator 12, and applies the blue illumination light to a blue intensity modulation panel 3aB.

As illustrated in FIG. 8, the image display device includes a multiplexer 11 that combines and emits illumination light applied from each intensity modulation panel. Since functions of the multiplexer 11 are similar to those in the fourth embodiment, detailed description thereof will be omitted.

In this way, the multiplexer 11 combines a plurality of pieces of monochromatic light so that the image display device can display full-color images and moving images.

Since other components are similar to those in the first embodiment, detailed description thereof will be omitted. It goes without saying that each phase modulation panel and each intensity modulation panel are constituted by a plurality of pixel groups, and illumination light is divided for each pixel group.

6. Sixth embodiment according to the present technology (block unit)

In the embodiments described so far, a mode is adopted in which pixels of a panel are rewritten line-sequentially. In such an embodiment, as illustrated in FIG. 4, the panel is smoothly rewritten from the Nth frame 8a to the N+1th frame 8b.

Figure 9:
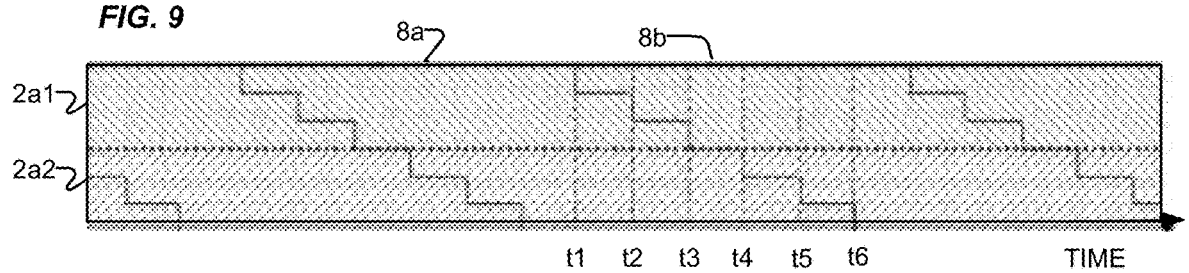
FIG. 9 illustrates how a phase modulation pattern of a phase modulation panel according to the present technology changes over time.

On the other hand, a mode may be adopted in which pixels are rewritten in an order similar to line sequence. For example, a mode may be adopted in which a plurality of pixels is rewritten in a batch in predetermined block (chunk) units. FIG. 9 illustrates how a phase modulation pattern of a phase modulation panel changes over time in a case where pixels are rewritten in block units.

In FIG. 9, a horizontal axis indicates passage of time. The closer to the right, the more time has passed. A vertical axis indicates the phase modulation pattern of the phase modulation panel. In this example, the phase modulation panel is divided into two phase modulation pixel groups (2a1 and 2a2), and is rewritten in order from the upper edge to the lower edge of the phase modulation panel. First, the phase modulation pixel group 2a1 in the upper half of the phase modulation panel is rewritten in order. Thereafter, the phase modulation pixel group 2a2 in the lower half of the phase modulation panel is rewritten in order.

Regions defined by stepped lines from the upper left to the lower right indicate frames. The Nth frame illustrated in FIG. 2 corresponds to 8a in FIG. 9. The Nth frame illustrated in FIG. 3 corresponds to 8b in FIG. 9. As illustrated in FIG. 9, the phase modulation panel is rewritten in accordance with the Nth frame 8a, and then the phase modulation panel is rewritten in accordance with the N+1th frame 8b.

How the phase modulation pattern of the phase modulation panel is rewritten with the passage of time is described below.

(1) In the state immediately before time t1, the phase modulation pattern on the entire surface of the panel corresponds to the Nth frame 8a.

(2) At time t1, the phase modulation pattern in the top one-sixth is rewritten in a batch in accordance with the N+1th frame 8b.

(3) The phase modulation pattern is not rewritten between time t1 and time t2.

(4) At time t2, the phase modulation pattern in the range from one-sixth to two-sixths from the upper edge is rewritten in a batch in accordance with the N+1th frame 8b.

(5) The phase modulation pattern is not rewritten between time t2 and time t3.

(6) At time t3, the phase modulation pattern in the range from two-sixths to three-sixths from the upper edge is rewritten in a batch in accordance with the N+1th frame 8b.

(7) The phase modulation pattern is not rewritten between time t3 and time t4.

(8) At time t4, the phase modulation pattern in the range from three-sixths to four-sixths from the upper edge is rewritten in a batch in accordance with the N+1th frame 8b.

(9) The phase modulation pattern is not rewritten between time t4 and time t5.

(10) At time t5, the phase modulation pattern in the range from four-sixths to five-sixths from the upper edge is rewritten in a batch in accordance with the N+1th frame 8b.

(11) The phase modulation pattern is not rewritten between time t5 and time t6.

(12) At time t6, the phase modulation pattern in the range from five-sixths from the upper edge to the lower edge is rewritten in a batch in accordance with the N+1th frame 8b.

Note that, although the pixels are rewritten in six stages in the above-described embodiment, it goes without saying that this number "six" is just an example. Furthermore, although pixels in a plurality of rows are rewritten in a batch in the above-described embodiment, one row may be divided and rewritten in a plurality of stages.

Furthermore, although a phase modulation panel is used in the description of the above-described embodiment, a mode may be adopted in which an intensity modulation panel is rewritten in block units.

Note that the effects described herein are merely illustrative and are not intended to be restrictive, and other effects may be obtained.

Note that the present technology may also have the following configurations.

[1] An image display device including at least:
a control unit;
a light source unit;
a phase modulation unit; and
an intensity modulation unit,
in which the control unit controls drive of at least one of the light source unit, the phase modulation unit, or the intensity modulation unit in accordance with an image signal,
the phase modulation unit includes a phase modulation panel constituted by a plurality of phase modulation pixel groups,
the intensity modulation unit includes an intensity modulation panel constituted by a plurality of intensity modulation pixel groups,
the light source unit applies first illumination light to the phase modulation panel,
the phase modulation panel modulates a phase of the first illumination light applied from the light source unit, divides second illumination light for each predetermined phase modulation pixel group, and applies the second illumination light to the intensity modulation panel for each predetermined intensity modulation pixel group, and
the intensity modulation panel modulates an intensity of the second illumination light applied from the phase modulation panel.

[2] The image display device according to [1], in which the phase modulation panel and the intensity modulation panel are rewritten line-sequentially or in a similar order.

[3] The image display device according to [1] or [2], in which the light source unit emits coherent light.

[4] The image display device according to any one of [1] to [3], in which the light source unit emits a laser beam.

[5] The image display device according to any one of [1] to [4], in which the phase modulation panel and/or the intensity modulation panel is a liquid crystal element.

[6] The image display device according to any one of [1] to [5], in which the phase modulation panel and/or the intensity modulation panel is a MEMS mirror.

[7] The image display device according to any one of [1] to [6], in which the phase modulation panel applies the second illumination light in such a way that side edges of adjacent pieces of the second illumination light overlap each other.

[8] The image display device according to any one of [1] to [7], in which the light source unit emits invisible light.

[9] The image display device according to any one of [1] to [8], further including:
a plurality of the light source units;
a plurality of the phase modulation panels;
a plurality of the intensity modulation panels; and
a multiplexer,
in which each of the light source units emits the first illumination light in red, green, or blue,
each of the phase modulation panels emits the second illumination light in red, green, or blue,
each of the intensity modulation panels emits third illumination light in red, green, or blue, and
the multiplexer combines and emits the third illumination light emitted from each of the intensity modulation panels.

[10] The image display device according to [9], in which the multiplexer combines pieces of the illumination light by allowing light of a predetermined wavelength to pass through and reflecting light of other wavelengths.

[11] The image display device according to [9] or [10], in which the multiplexer is a dichroic prism.

[12] The image display device according to any one of [1] to [7], further including:
a color separator;
a plurality of the phase modulation panels;

a plurality of the intensity modulation panels; and
a multiplexer,
in which the color separator color-separates white illumination light emitted from the light source unit into pieces of the illumination light in red, green, or blue, and applies the illumination light to each of the phase modulation panels,
each of the phase modulation panels emits the second illumination light in at least red, green, and blue,
each of the intensity modulation panels emits third illumination light in at least red, green, and blue, and
the multiplexer combines and emits the third illumination light emitted from each of the intensity modulation panels.

[13] The image display device according to [12], in which the color separator separates color elements of the white illumination light by allowing light of a predetermined wavelength to pass through and reflecting light of other wavelengths.

[14] The image display device according to [12] or [13], in which the color separator is a dichroic prism.

REFERENCE SIGNS LIST

1 Light source unit
2 Phase modulation unit
2a Phase modulation panel
2a1 Phase modulation pixel group in the upper half
2a2 Phase modulation pixel group in the lower half
2b Phase modulation panel drive unit
3 Intensity modulation unit
3a Intensity modulation panel
3a1 Intensity modulation pixel group in the upper half
3a2 Intensity modulation pixel group in the lower half
3a3 Region where pieces of emitted illumination light overlap each other
3b Intensity modulation panel drive unit
4 Control unit
5 Lens
6 Screen
8a Nth frame
8b N+1th frame
11 Multiplexer
12 Color separator
21 First illumination light
22 Second illumination light
23 Third illumination light
24 Fourth illumination light

What is claimed is:

1. An image display device comprising at least:
a control unit;
a light source unit;
a phase modulation unit; and
an intensity modulation unit,
wherein the control unit controls drive of at least one of the light source unit, the phase modulation unit, or the intensity modulation unit in accordance with an image signal,
wherein the light source unit emits invisible light,
wherein the phase modulation unit includes a phase modulation panel constituted by a plurality of phase modulation pixel groups,
wherein the intensity modulation unit includes an intensity modulation panel constituted by a plurality of intensity modulation pixel groups, wherein the light source unit applies first illumination light to the phase modulation panel,
wherein the phase modulation panel modulates a phase of the first illumination light applied from the light source unit, divides second illumination light for each predetermined phase modulation pixel group, and applies the second illumination light to the intensity modulation panel for each predetermined intensity modulation pixel group, and
wherein the intensity modulation panel modulates an intensity of the second illumination light applied from the phase modulation panel.

2. The image display device according to claim 1, wherein the phase modulation panel and the intensity modulation panel are rewritten line-sequentially or in a similar order.

3. The image display device according to claim 1, wherein the phase modulation panel and/or the intensity modulation panel is a liquid crystal element.

4. The image display device according to claim 1, wherein the phase modulation panel and/or the intensity modulation panel is a MEMS mirror.

5. The image display device according to claim 1, wherein the phase modulation panel applies the second illumination light in such a way that side edges of adjacent pieces of the second illumination light overlap each other.

6. The image display device according to claim 1, further comprising:
a plurality of the light source units;
a plurality of the phase modulation panels;
a plurality of the intensity modulation panels; and
a multiplexer,
wherein each of the plurality of light source units emits the first illumination light in red, green, or blue,
wherein each of the plurality of phase modulation panels emits the second illumination light in red, green, or blue,
wherein each of the plurality of intensity modulation panels emits third illumination light in red, green, or blue, and wherein the multiplexer combines and emits the third illumination light emitted from each of the plurality of intensity modulation panels.

7. The image display device according to claim 6, wherein the multiplexer combines pieces of the illumination light by allowing light of a predetermined wavelength to pass through and reflecting light of other wavelengths.

8. The image display device according to claim 6, wherein the multiplexer is a dichroic prism.

9. The image display device according to claim 1, further comprising:
a color separator;
a plurality of the phase modulation panels;
a plurality of the intensity modulation panels; and
a multiplexer,
wherein the color separator separates color elements of white illumination light emitted from the light source unit into red, green, or blue, and applies the first illumination light to each of the plurality of phase modulation panels,
wherein each of the plurality of phase modulation panels emits the second illumination light in at least red, green, and blue,
wherein each of the plurality of intensity modulation panels emits third illumination light in at least red, green, and blue, and
wherein the multiplexer combines and emits the third illumination light emitted from each of the plurality of intensity modulation panels.

10. The image display device according to claim 9, wherein the color separator separates the color elements of the white illumination light by allowing light of a predetermined wavelength to pass through and reflecting light of other wavelengths.

11. The image display device according to claim 9, wherein the color separator is a dichroic prism.

12. An image display device comprising at least:
a control unit;
a plurality of light source units;
a plurality of phase modulation units;
a plurality of intensity modulation units; and
a multiplexer,
wherein the control unit controls drive of at least one of the plurality of light source units, the plurality of phase modulation units, or the plurality of intensity modulation units in accordance with an image signal,
wherein each of the plurality of phase modulation units include a phase modulation panel constituted by a plurality of phase modulation pixel groups,
wherein each of the plurality of intensity modulation units include an intensity modulation panel constituted by a plurality of intensity modulation pixel groups,
wherein each of the plurality of light source units apply a first illumination light to each of the plurality of phase modulation panels,
wherein each of the plurality of phase modulation panels modulates a phase of the first illumination light applied from each of the plurality of light source units, divides second illumination light for each predetermined phase modulation pixel group, and applies the second illumination light to each of the plurality of intensity modulation panels for each predetermined intensity modulation pixel group,
wherein each of the plurality of intensity modulation panels modulates an intensity of the second illumination light applied from each of the plurality of phase modulation panels,
wherein each of the plurality of light source units emits the first illumination light in red, green, or blue,
wherein each of the plurality of phase modulation panels emits the second illumination light in red, green, or blue,
wherein each of the plurality of intensity modulation panels emits third illumination light in red, green, or blue, and
wherein the multiplexer combines and emits the third illumination light emitted from each of the plurality of intensity modulation panels.

13. The image display device according to claim 12, wherein the plurality of light source units emit coherent light.

14. The image display device according to claim 12, wherein the plurality of light source units emit a laser beam.

15. The image display device according to claim 12, wherein the plurality of light source units emits invisible light.

16. An image display device comprising at least:
a control unit;
a plurality of light source units;
a plurality of phase modulation units;
a plurality of intensity modulation units;
a multiplexer; and
a color separator,
wherein the control unit controls drive of at least one of the plurality of light source units, the plurality of phase modulation units, or the plurality of intensity modulation units in accordance with an image signal,
wherein each of the plurality of phase modulation units include a phase modulation panel constituted by a plurality of phase modulation pixel groups,
wherein each of the plurality of intensity modulation units include an intensity modulation panel constituted by a plurality of intensity modulation pixel groups,
wherein each of the plurality of light source units apply a first illumination light to each of the plurality of phase modulation panels,
wherein each of the plurality of phase modulation panels modulates a phase of the first illumination light applied from each of the plurality of light source units, divides second illumination light for each predetermined phase modulation pixel group, and applies the second illumination light to each of the plurality of intensity modulation panels for each predetermined intensity modulation pixel group,
wherein each of the plurality of intensity modulation panels modulates an intensity of the second illumination light applied from each of the plurality of phase modulation panels,
wherein the color separator separates color elements of white illumination light emitted from a light source unit of the plurality of light source units into red, green, or blue, and applies the first illumination light to each of the phase modulation panels,
wherein each of the plurality of phase modulation panels emits the second illumination light in at least red, green, and blue,
wherein each of the plurality of intensity modulation panels emits third illumination light in at least red, green, and blue, and
wherein the multiplexer combines and emits the third illumination light emitted from each of the plurality of intensity modulation panels.

17. The image display device according to claim 16, wherein the plurality of light source units emit coherent light.

18. The image display device according to claim 16, wherein the plurality of light source units emit a laser beam.

19. The image display device according to claim 16, wherein at least one of the plurality of light source units emits invisible light.

20. The image display device according to claim 16, wherein the color separator is a dichroic prism.

* * * * *